F. FAILLACE.
CONVERTIBLE VEHICLE BODY.
APPLICATION FILED MAR. 15, 1920.

1,385,909.

Patented July 26, 1921.
2 SHEETS—SHEET 1.

Frank Faillace,
INVENTOR

BY Victor J. Evans,
ATTORNEY

F. FAILLACE.
CONVERTIBLE VEHICLE BODY.
APPLICATION FILED MAR. 15, 1920.
1,385,909.
Patented July 26, 1921.
2 SHEETS—SHEET 2.
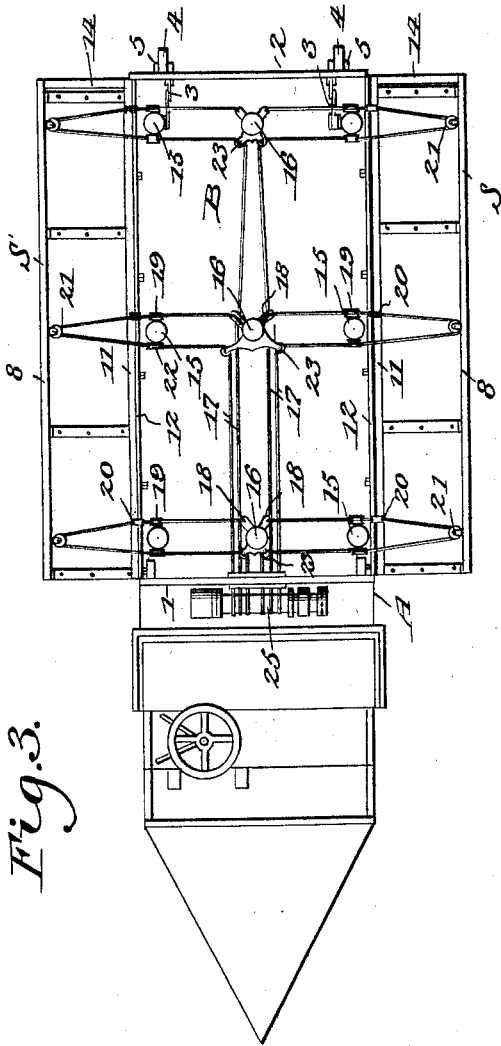
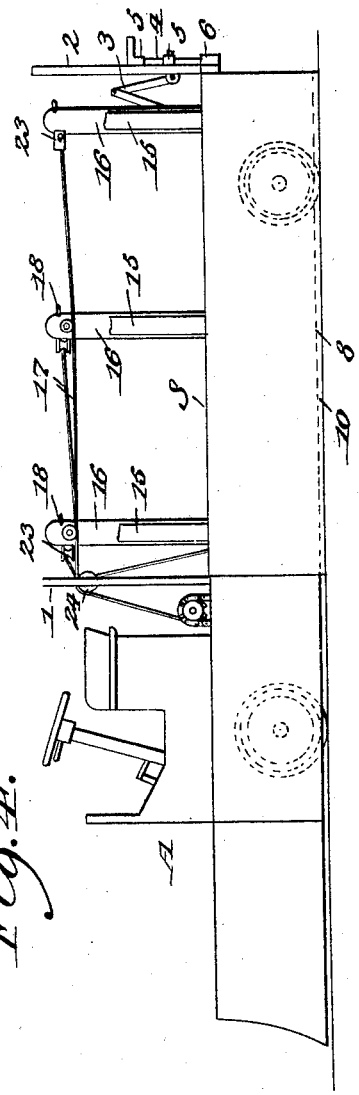
Frank Faillace
INVENTOR
BY Victor J. Evans,
ATTORNEY

UNITED STATES PATENT OFFICE.

FRANK FAILLACE, OF NEW YORK, N. Y.

CONVERTIBLE VEHICLE-BODY.

1,385,909.  Specification of Letters Patent.  Patented July 26, 1921.

Application filed March 15, 1920. Serial No. 365,942.

*To all whom it may concern:*

Be it known that I, FRANK FAILLACE, a citizen of the United States, residing at New York, in the county of New York and State of New York, have invented new and useful Improvements in Convertible Vehicle-Bodies, of which the following is a specification.

This invention relates to convertible vehicle bodies.

Principally it is my intention to produce a vehicle with a body of this character for expeditiously and effectually removing snow. The vehicle, in this instance a "truck," supports the body, which consists of a fixed front end board, a movable rear end gate and shovels, so termed for the sake of convenience. The "shovels" are made up from sections hingedly joined, one of said sections being swingingly mounted upon the side edges of the platform of the vehicle, the other of said sections which as stated, is hingedly joined to the other section, is of right angular formation. The "shovels" are adapted to be let down so as to be disposed at opposite sides of the vehicle. As the vehicle moves over the thoroughfare from which the snow is to be removed, the snow is initially gathered by the shovels. After the "shovels" have been filled, they may be elevated to a position over and above the platform of the vehicle, between the front end board and the rear end gate to completely house the snow after which the snow may be successfully transported.

Another object of my invention is to obviate or reduce to a minimum, human labor, incident to the removal of a heavy snowfall from thoroughfares over which there is much traffic. The snow may be removed quickly, that is, it may be removed before it becomes hard or set, because under such conditions, its removal is very difficult and it requires much labor. With a vehicle having a body of the character mentioned, the snow may be removed expeditiously and effectually, without extra human labor, other than that of one man.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood, that no limitations are necessarily made to the precise structural details therein exhibited but that changes, alterations and modifications within the scope of the claims may be resorted to when desired.

In the drawings:—

Fig. 3 is a top plan view showing the shovels lowered as in Fig. 1.

Fig. 4 is a side elevation.

Figure 1:
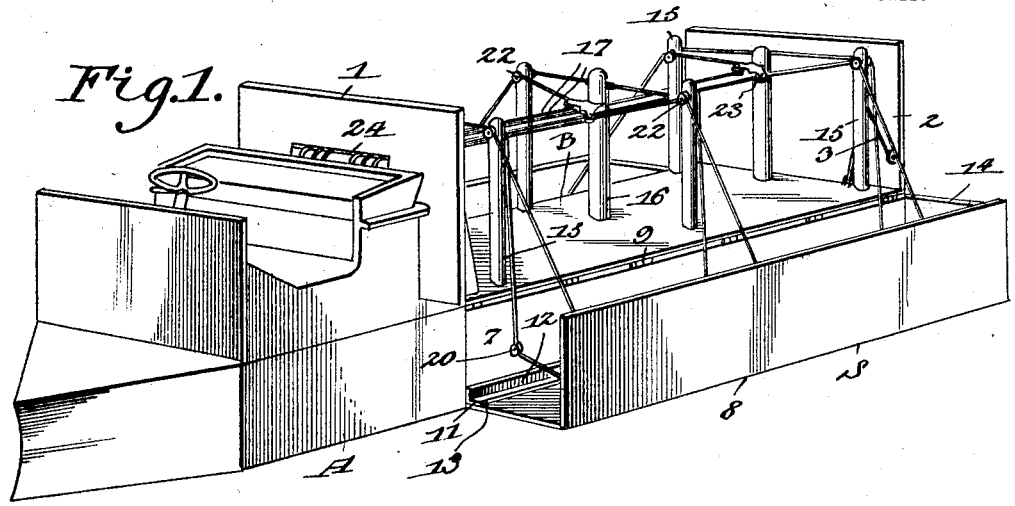
Figure 1 is a perspective view of the vehicle equipped with my improved convertible body, the shovels being shown lowered.
Figure 2:
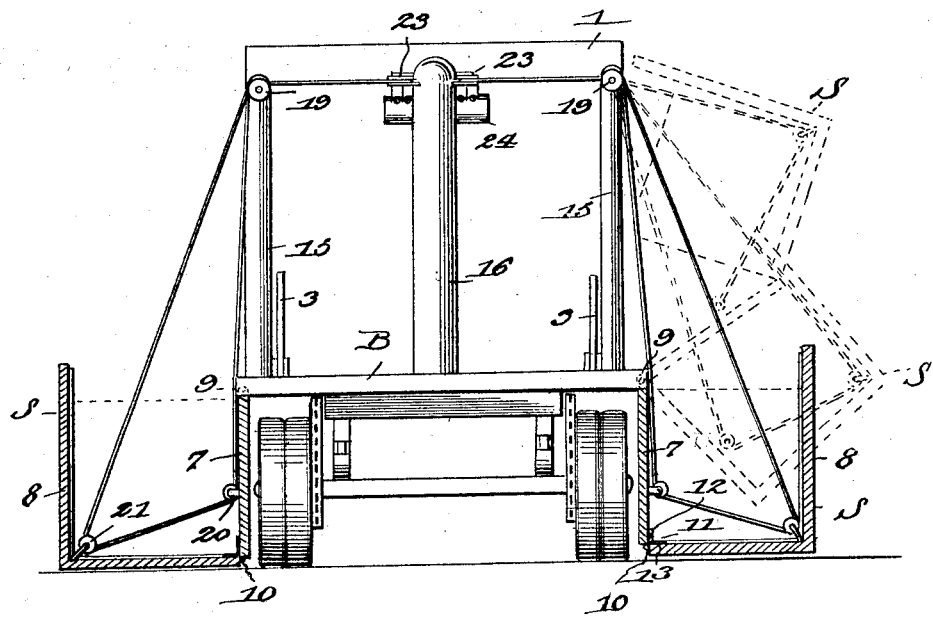
Fig. 2 is a rear view partly in section, the dotted lines are indicative of the relative movements and positions assumed by the sections which form the shovels.

Referring now to the drawings in detail the letter A, designates a vehicle having a platform B. Fixedly mounted upon the platform near the front thereof is a front end board 1. At the rear end of the platform and capable of being held in a vertical secured position and also capable of being swung rearwardly and away from the platform, is a rear end gate, 2. This end gate 2, is held in its vertical position by a set of arms 3, and by sliding bolts 4, the bolts being slidably mounted in guides 5, and are adapted to be slid into engagement with clips 6, secured to the edge of the platform B. Swingingly mounted upon the platform at the sides thereof, are the shovels S. The said shovels each consists of sections 7 and 8. The section 7, is swingingly connected to the platform B, as at 9, and the section 8, which is right angular, is hingedly joined to the section 7, as at 10. An angle iron 11, is attached to the section 7, that is to say, securing elements are passed through the flange 12, and take into the section 7, the other flange 13, of the angle iron, when the sections 7 and 8, are lowered, serves to prevent the independent upward movements of the right angled section 8. It will be seen that the shovels are open at the forward ends and that they are closed by end pieces 14, at the rear ends thereof, so that the snow, as the shovels pass over the surface of the street, is made to fill said shovels after which they may be raised in a manner to be presently described.

Upstanding upon the platform B, are sets of posts. Two sets of posts designated by the numeral 15, are disposed at either side of the platform B, near the edges thereof whereas the third set of upstanding posts, designated by the numeral 16, are arranged centrally of the platform. The posts in each set are arranged equi-distantly apart and further, they are arranged opposite each other in alinement transversely. Cables 17, or any other flexible elements may be utilized for raising or lowering the sections 7 and 8. These cables, though they are of different lengths are one and all arranged in a specific similar manner, therefor, a description of the arrangement of one cable will suffice for all. Secured to the post 16, near the upper end thereof is a staple or the like 18. One terminal of the cable 17, is attached to said staple 18, and the cable is passed over a pulley 19, mounted near the upper end of a post 15, thence over a pulley 20, on the section 7, thence over a pulley 21, on the section 8, thence over a pulley 22, on the post 15, the said pulley 22, being disposed directly opposite the pulley 19.

From the pulley 22, the cable is passed over a pulley 23, mounted at the upper end of the post 16, from which the cable passes over a roller 24, mounted in an opening in the front end board 1, onto a drum 25. The drum 25, upon which the cables are adapted to be wound, may derive its rotary force from the engine, (not shown), of the vehicle, any suitable controlling mechanism to be arranged between the engine and the drum 25, may be utilized for the purpose of winding up the cables or for paying them off. The cables, when they are drawn up taut, serve to hold the sections 7 and 8 elevated over and above the platform, beside serving to raise the said sections. In lowering, the sections 7 and 8, after the cables have been paid out to a slight extent, collapse, at the point where they are hingedly joined, after which they will gravitate under their own weight to the opposite sides of the vehicle for shovel formation, as will be manifest.

The front of the vehicle may be constructed in a manner so as to divert the snow to pass to opposite sides directly into the path of the shovel.

It is to be understood that suitable clutch mechanism may be employed in conjunction and a pair of drums in lieu of the drum 25, so that either of the shovels S, may be raised and lowered independently of the other.

What is claimed as new is:—

1. In a device as characterized, a platform, a structure embodying shiftable elements, each of said elements including relatively movable sections, the said elements being shiftable with respect to said platform to constitute a hollow body therewith, and to constitute shovels at the sides and below said platform.

2. In a device as characterized, a structure including a platform and shiftable elements, each of said elements being connected to said platform and including relatively movable sections, the said elements being shiftable with respect to said platform to constitute a hollow body therewith, and shiftable to constitute three-sided shovels at the sides and below said platform.

3. In a device as characterized, a structure including a platform and shiftable elements connected to said platform, each of said elements including relatively movable sections, the said elements being shiftable with respect to the platform to constitute a hollow body therewith, and shiftable to constitute shovels including a bottom, sides and a rear end at the sides and below the platform.

4. In a device as characterized, a structure including a platform and shiftable elements connected thereto, each of said elements including relatively movable sections, the said elements being shiftable with respect to said platform to constitute a hollow body therewith, and shiftable to constitute shovels at the sides and below the said platform; and means for effecting the movement of said elements.

5. In a device as characterized, a structure including a platform and shiftable elements connected thereto, each of said elements including relatively movable hinged sections, the said elements being shiftable with respect to the platform to constitute a hollow body therewith, and shiftable to constitute shovels at the sides and below the platform; means for effecting the movement of said elements, and a spreader in advance of the elements.

6. In a device as characterized, a structure including a platform, a shiftable end board and shiftable elements connected to the platform, each of said elements including relatively movable sections, the said elements being shiftable with respect to the platform to constitute a hollow body therewith, and shiftable to constitute shovels at the sides and below the said platform; and means for shifting the elements.

In testimony whereof I have affixed my signature.

FRANK FAILLACE.